(12) United States Patent
Saito et al.

(10) Patent No.: US 9,318,740 B2
(45) Date of Patent: Apr. 19, 2016

(54) NON-AQUEOUS ELECTROLYTE SECONDARY BATTERY

(75) Inventors: Motoharu Saito, Kobe (JP); Masahisa Fujimoto, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 900 days.

(21) Appl. No.: 13/073,506

(22) Filed: Mar. 28, 2011

(65) Prior Publication Data

US 2011/0244332 A1   Oct. 6, 2011

(30) Foreign Application Priority Data

Mar. 31, 2010  (JP) .................................. 2010-081809
Mar. 9, 2011   (JP) .................................. 2011-051935

(51) Int. Cl.

| H01M 4/50 | (2010.01) |
|---|---|
| H01M 4/52 | (2010.01) |
| H01M 4/48 | (2010.01) |
| H01M 4/505 | (2010.01) |
| H01M 4/525 | (2010.01) |
| H01M 10/0525 | (2010.01) |
| H01M 10/054 | (2010.01) |

(52) U.S. Cl.
CPC .............. *H01M 4/505* (2013.01); *H01M 4/525* (2013.01); *H01M 10/054* (2013.01); *H01M 10/0525* (2013.01); *Y02E 60/122* (2013.01)

(58) Field of Classification Search
CPC .......... H01M 10/0525; H01M 10/054; H01M 4/505; H01M 4/525
See application file for complete search history.

(56) References Cited

U.S. PATENT DOCUMENTS

| 2002/0098146 A1 | 7/2002 | Takada et al. | |
|---|---|---|---|
| 2009/0142663 A1* | 6/2009 | Takeuchi et al. | 429/188 |
| 2010/0104944 A1* | 4/2010 | Saito et al. | 429/223 |
| 2010/0173202 A1 | 7/2010 | Saito et al. | |
| 2010/0248023 A1* | 9/2010 | Tsuruta et al. | 429/188 |

FOREIGN PATENT DOCUMENTS

| JP | 05074451 A | * | 3/1993 | ............. H01M 4/58 |
|---|---|---|---|---|
| JP | 2002-220231 A |  | 8/2002 | |
| JP | 2007-119340 A |  | 5/2007 | |
| JP | 2009-032681 A |  | 2/2009 | |
| WO | WO 2008081839 A1 | * | 7/2008 | |
| WO | WO 2009001557 A1 | * | 12/2008 | ............. H01M 4/525 |

OTHER PUBLICATIONS

D. Carlier et al., "On The metastable 02-type LiCoO2"; Solid State Ionics; (2001), vol. 144; pp. 263-276.
Zhonghua Lu et al., "T2 and O2 Li2/3[CoxNi1/3-x/2]O2 Electrode Materials"; Journal of The Electrochemical Society, vol. 149 (8); pp. A1083-A1091 (2002).
Japanese Office Action dated Jul. 29, 2014, issued in corresponding Japanese Patent Application No. 2011-051935 (5 pages).

* cited by examiner

*Primary Examiner* — Carlos Barcena
(74) *Attorney, Agent, or Firm* — Westerman, Hattori, Daniels & Adrian, LLP (57) ABSTRACT

A non-aqueous electrolyte secondary battery has a positive electrode containing a positive electrode active material, a negative electrode, and a non-aqueous electrolyte. The positive electrode active material includes a lithium-containing oxide $Li_{x1}Na_{y1}Co_\alpha Mn_\beta O_\gamma$, where $0.66<x1<1.1$, $0<y1\leq 0.02$, $0.75\leq \alpha<1$, $0<\beta \leq 0.25$, and $1.9\leq \gamma \leq 2.1$.

13 Claims, 4 Drawing Sheets

NON-AQUEOUS ELECTROLYTE SECONDARY BATTERY

BACKGROUND OF THE INVENTION

1. Field of the Invention

The present invention relates to non-aqueous electrolyte secondary batteries.

2. Description of Related Art

In recent years, lithium-ion secondary batteries, which are one of several types of non-aqueous electrolyte secondary batteries, have been used as a power source for various mobile devices. The power consumption of such mobile devices has been increasing as the number of functions of mobile devices has increased, and there is a corresponding demand for lithium-ion secondary batteries having higher energy densities.

For that reason, lithium-containing oxide produced by ion exchanging sodium-containing oxide has been studied as a candidate for a next-generation high-capacity positive electrode active material.

The positive electrode active material $LiCoO_2$, which has already been in commercial use, is characterized by having an O3 structure belonging to the space group R-3m. On the other hand, the $LiCoO_2$ prepared by ion exchanging is characterized by having an O2 structure, and it typically belongs to the space group $P6_3mc$. The O3 structure is a crystal structure in which a lithium atom exists at the center of the oxygen octahedron and three kinds of stacks comprising a layer including oxygen and a layer including a transition metal oxide $MO_6$ exist per unit cell. On the other hand, the O2 structure is a crystal structure in which a lithium atom exists at the center of the oxygen octahedron, as in the O3 structure, and two kinds of stacks comprising a layer including oxygen and a layer including a transition metal oxide $MO_6$ exist per unit cell.

When the $LiCoO_2$ having an O3 structure is charged to 4.6 V (vs. Li/Li$^+$), about 50% of the lithium in the $LiCoO_2$ is extracted, and consequently, the crystal structure thereof deteriorates, resulting in degradation of the reversibility of lithium insertion and deinsertion. On the other hand, the $LiCoO_2$ having an O2 structure is capable of being charged and discharged even when about 80% of the lithium in the $LiCoO_2$ is extracted (see Solid State Ionics, 144 (2001) 263), so it is one of the most promising candidates for the next generation high-capacity positive electrode active material.

However, the $LiCoO_2$ having an O2 structure is difficult to produce. The $LiCoO_2$ having an O2 structure can be obtained by preparing $Na_{0.7}CoO_2$ having a P2 structure and ion exchanging the sodium with lithium. However, when the temperature during the ion exchanging exceeds 150° C., $LiCoO_2$ having an O3 structure results, whereas the temperature is too low, the source material not having been ion-exchanged remains.

Another problem with the $LiCoO_2$ having an O2 structure and the $LiCoO_2$ having an O3 structure has been that they show poor charge-discharge cycle performance when the end-of-charge potential is set at 4.6 V (vs. Li/Li$^+$) or higher. The cause is believed to be that an irreversible change in the crystal structure occurs during the process of the lithium deinsertion from the crystal, and therefore it is no longer possible to maintain the initial crystal structure.

Japanese Published Unexamined Patent Application No. 2009-32681 (Patent Document 1) proposes adding lithium to the sodium oxide used as the starting material. The publication shows that the capacity can be increased because the positive electrode active material contains a complementary structure of $Li_2MnO_3$ in addition to the main structure. It is believed that the interaction between the main structure and the complementary structure contributes to an increase of the capacity density of the positive electrode active material.

However, the just-described positive electrode active material shows an average discharge potential of only about 3.6 V when the potential is in the range of from 2.0 V to 5.0 V (vs. Li/Li$^+$), so the material is not desirable as a next generation high-capacity positive electrode material.

BRIEF SUMMARY OF THE INVENTION

It is an object of the present invention to provide a non-aqueous electrolyte secondary battery that has a high energy density and at the same time shows excellent charge-discharge cycle performance.

The present invention provides a non-aqueous electrolyte secondary battery comprising a positive electrode containing a positive electrode active material, a negative electrode, and a non-aqueous electrolyte, the positive electrode active material comprising a lithium-containing oxide $Li_{x1}Na_{y1}Co_\alpha Mn_\beta O_\gamma$, where $0.66<x1<1.1$, $0<y1\leq0.02$, $0.75\leq\alpha<1$, $0<\beta\leq0.25$, and $1.9\leq\gamma\leq2.1$.

According to the present invention, it becomes possible to provide a non-aqueous electrolyte secondary battery that has a high energy density and at the same time shows excellent charge-discharge cycle performance.

DETAILED DESCRIPTION OF THE INVENTION

A non-aqueous electrolyte secondary battery according to the present invention has a positive electrode containing a positive electrode active material, a negative electrode, and a non-aqueous electrolyte. The positive electrode active material includes a lithium-containing oxide represented by the formula $Li_{x1}Na_{y1}Co_\alpha Mn_\beta O_\gamma$, where $0.66<x1<1.1$, $0<y1\leq0.02$, $0.75\leq\alpha<1$, $0<\beta\leq0.25$, and $1.9\leq\gamma\leq2.1$.

The just-mentioned lithium-containing oxide may contain an oxide having an O2 structure. The oxide may contain an oxide belonging to the space group C2/m or C2/m. The oxide may contain $Li_2MnO_3$ or $LiCoO_2$ having an O3 structure in an amount of less than 20%.

The lithium-containing oxide may be prepared by ion exchanging the sodium in a sodium-containing oxide with lithium, the sodium-containing oxide containing sodium, lithium in a molar amount not greater than that of the sodium, cobalt, and manganese. It is more preferable that the lithium-containing oxide be prepared by ion exchanging a portion of sodium contained in a sodium-containing oxide represented by the formula $Li_{x2}Na_{y2}Co_\alpha Mn_\beta O_\gamma$, where $0<x2\leq0.1$, $0.66<y2<0.75$, $0.75\leq\alpha<1$, $0<\beta\leq0.25$, and $1.9\leq\gamma\leq2.1$, with lithium.

The above-described positive electrode active material contains cobalt and manganese, and in addition, it contains an O2 structure with a high content of cobalt. Therefore, the positive electrode active material shows a high average discharge potential and moreover has a stable crystal structure even at a high potential. As a result, the non-aqueous electrolyte secondary battery that comprises a positive electrode containing the above-described positive electrode active material, a negative electrode, and a non-aqueous electrolyte shows a high energy density and excellent charge-discharge cycle performance.

The battery exhibits particularly good cycle performance within the potential range of from an end-of-discharge potential of 2.0 V (vs. Li/Li$^+$) to an end-of-charge potential of 5.0 V (vs. Li/Li$^+$). The battery exhibits better cycle performance within the potential range of from an end-of-discharge potential of 3.2 V (vs. Li/Li$^+$) to an end-of-charge potential is 5.0 V (vs. Li/Li$^+$), and still better cycle performance within the potential range of from an end-of-discharge potential of 3.2 V (vs. Li/Li$^+$) to an end-of-charge potential of 4.8 V (vs. Li/Li$^+$). When the end-of-discharge potential is higher, the charge-discharge cycle performance becomes better because the crystal structure becomes more stable. When the end-of-charge potential is lower, the charge-discharge cycle performance becomes better because the electrolyte decomposition is lessened.

When the lithium content x1 in the above-described positive electrode active material is lower than the foregoing range, the amount of the lithium involved in the charge-discharge reactions becomes less, and therefore the theoretical capacity decreases. When the lithium content x1 in the above-described positive electrode active material is higher than the foregoing range, lithium atoms enter the transition metal sites, and therefore the capacity density decreases.

As the amount of cobalt in the positive electrode active material increases, the amount of lithium after the ion exchange increases correspondingly. The reason is believed to be as follows. Before the ion exchange, cobalt can be stable in the sodium oxide even when it has a valence of 3 or more. However, after the ion exchange, cobalt having a valence of 3 is stable in the lithium-containing oxide, so cobalt is reduced during the ion exchange and lithium ions are absorbed in the crystal structure.

When the sodium content y1 in the above-described positive electrode active material is higher than the foregoing range, the crystal structure tends to be deteriorated easily when the insertion and deinsertion of sodium takes place. On the other hand, within the range y1≤0.02, the crystal structure becomes stable. Note that if y1≤0.02, sodium may be unable to detect by an XRD measurement.

When the cobalt content α in the above-described positive electrode active material is lower than the foregoing range, the discharge potential becomes low. On the other hand, when the cobalt content α is higher than the foregoing range, a stable crystal structure cannot be obtained during the charging process at 4.6 V (vs. Li/Li$^+$) or higher. It is more preferable that the cobalt content α be within a range of from 0.80 to 0.95 because the energy density will become even higher.

When the manganese content β of the above-described positive electrode active material is higher than the foregoing range, the discharge capacity density at 3.2 V or less increases, and consequently, the average discharge potential deteriorates.

It is also possible to add, to the above-described positive electrode active material, at least one element selected from the group consisting of magnesium, nickel, zirconium, molybdenum, tungsten, aluminum, chromium, vanadium, cerium, titanium, iron, potassium, gallium, and indium. When the amount of the additive element is 10 mol % or less with respect to the total molar amount of cobalt and manganese, it is expected that the thermal stability during charge will be improved.

Examples of the negative electrode used in the present invention include lithium, silicon, carbon, tin, germanium, aluminum, lead, indium, gallium, lithium alloys, carbon or silicon materials in which lithium has been absorbed, and alloys and mixtures thereof.

When the electrode has high conductivity, the electrode can serve the function even without any conductive agent. However, when the electrode has low conductivity, it is desirable that a conductive agent be added to the electrode. Any material having electrical conductivity may be used as the conductive agent. In particular, it is possible to use at least one substance among oxides, carbides, nitrides, and carbon materials that have high conductivity. Examples of the oxides include tin oxide and indium oxide. Examples of the carbides include tungsten carbide and zirconium carbide. Examples of the nitrides include titanium nitride and tantalum nitride.

When a conductive agent is added, the conductivity of the positive electrode cannot be increased sufficiently if the amount of the conductive agent added is too small. On the other hand, when the amount of the conductive agent added is too large, a high energy density cannot be obtained because the relative proportion of the positive electrode active material within the positive electrode becomes too small. For this reason, it is preferable that the amount of the conductive agent be from greater than 0 mass % to 30 mass %, more preferably from 1 mass % to 20 mass %, and still more preferably from 2 mass % to 10 mass %, with respect to the total amount of the active material.

Examples of the binder that may be added to the electrode include polytetrafluoroethylene, polyvinylidene fluoride, polyethylene oxide, polyvinyl acetate, polymethacrylate, polyacrylate, polyacrylonitrile, polyvinyl alcohol, styrene-butadiene rubber, carboxymethylcellulose, and combinations thereof.

When the amount of the binder agent used in the present invention is too large, a high energy density cannot be obtained because the relative proportion of the active material contained in the positive electrode becomes too small. For this reason, it is preferable that the amount of the binder be from greater than 0 mass % to 30 mass %, more preferably from 1 mass % to 20 mass %, and still more preferably from 2 mass % to 10 mass %, with respect to the total amount of the active material.

Examples of the non-aqueous solvent that may be used in the present invention include cyclic carbonic esters, chain carbonic esters, esters, cyclic ethers, chain ethers, nitriles, amides, and mixtures thereof.

Examples of the cyclic carbonic esters include ethylene carbonate, propylene carbonate, and butylenes carbonate, and it is also possible to use a cyclic carbonic ester in which part or all of the hydrogen groups of one of the foregoing cyclic carbonic esters is/are fluorinated. Examples of the cyclic carbonic esters include trifluoropropylene carbonate and fluoroethylene carbonate.

Examples of the chain carbonic esters include dimethyl carbonate, ethyl methyl carbonate, diethyl carbonate, methyl propyl carbonate, ethyl propyl carbonate, methyl isopropyl carbonate. It is also possible to use a chain carbonic ester in which part or all of the hydrogen groups of one of the foregoing chain carbonic esters is/are fluorinated.

Examples of the esters include methyl acetate, ethyl acetate, propyl acetate, methyl propionate, ethyl propionate, and γ-butyrolactone.

Examples of the cyclic ethers include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineol, and crown ether.

Examples of the chain ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butylphenyl ether, pentylphenyl ether, methoxytoluene, benzyl ethyl ether, diphenyl ether, dibenzyl ether, o-dimethoxybenzene, 1,2-diethoxyethane, 1,2-dibutoxy ethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the nitriles include acetonitrile. Examples of the amides include dimethylformamide.

The lithium salt to be used in the present invention may be any lithium salt that is commonly used in conventional lithium-ion secondary batteries. For example, it is possible to use at least one substance selected from $LiBF_4$, $LiPF_6$, $LiCF_3SO_3$, $LiC_4F_9SO_3$, $LiN(CF_3SO_2)_2$, $LiN(C_2F_5SO_2)_2$, $LiAsF_6$, and lithium difluoro(oxalate)borate.

EXAMPLES

Hereinbelow, examples of the present invention will be described in detail with reference to the drawings. It should be construed, however, that the present invention is not limited to the following examples, and various changes and modifications are possible without departing from the scope of the invention.

Example 1

Sodium nitrate ($NaNO_3$), cobalt oxide (II III) ($Co_3O_4$), and manganese oxide (III) ($Mn_2O_3$) as the source materials were mixed so as to obtain $Na_{0.7}Co_{11/12}Mn_{1/12}O_2$ (preparation composition). The mixture was kept at 900° C. for 10 hours, to obtain a sodium-containing oxide. In other examples and comparative examples, lithium carbonate ($Li_2CO_3$) was added to the just-described source materials and mixed in the case that lithium was contained in the preparation composition.

A molten salt bed in which lithium nitrate ($LiNO_3$) and lithium hydroxide (LiOH) were mixed at a mole percentage ratio of 61:39 was added to 5 g of the resultant sodium-containing oxide in an amount of 5 times equivalent weight. The mixture was kept at 200° C. for 10 hours, to thereby ion exchange a portion of sodium in the sodium-containing oxide with lithium. The substance after the ion exchange was washed with water, and the resultant lithium-containing oxide was used as the positive electrode active material.

80 mass % of the resultant positive electrode active material was mixed with 10 mass % of acetylene black as a conductive agent, 10 mass % of polyvinylidene fluoride as a binder agent, and the mixture was then mixed with N-methyl-2-pyrrolidone to form a slurry. The resultant slurry was applied onto an aluminum foil current collector. Thereafter, the resultant material was vacuum dried at 110° C., to prepare a working electrode 1.

Figure 1:
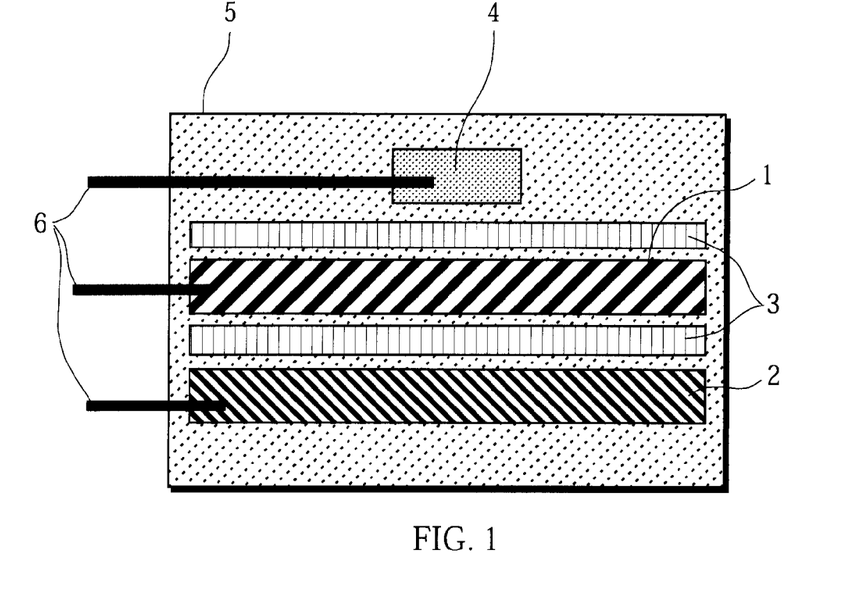
FIG. 1 is a schematic view illustrating a test cell used in the present invention.

A test cell as illustrated in FIG. 1 was prepared using the working electrode 1, a counter electrode 2, a separator 3, and a reference electrode 4. Metallic lithium was used for the counter electrode 2 and the reference electrode 4. The electrolyte solution used was as follows. Ethylene carbonate and diethyl carbonate were mixed in a volume percentage of 30:70 to prepare a non-aqueous solvent. Lithium hexafluorophosphate ($LiPF_6$) was added at a concentration of 1.0 mol/L to the mixed non-aqueous solvent, to prepare an electrolyte solution.

The obtained test cell was repeatedly charged and discharged 10 times within the range of from 2.0-5.0 V (vs. $Li/Li^+$). The current density in this test was set at 0.1 $mA/cm^2$.

Example 2

Except for using a sodium-containing oxide represented by the formula $Li_{0.1}Na_{0.7}Co_{11/12}Mn_{1/12}O_2$ (preparation composition), an experiment was conducted in the same manner as described in Example 1 above.

Example 3

Except for using a sodium-containing oxide represented by the formula $Na_{0.7}Co_{10/12}Mn_{2/12}O_2$ (preparation composition), an experiment was conducted in the same manner as described in Example 1 above.

Example 4

Except for using a sodium-containing oxide represented by the formula $Li_{0.1}Na_{0.7}Co_{10/12}Mn_{2/12}O_2$ (preparation composition), an experiment was conducted in the same manner as described in Example 1 above.

Example 5

Except for using a sodium-containing oxide represented by the formula $Li_{0.1}Na_{0.7}Co_{9/12}Mn_{3/12}O_2$ (preparation composition), an experiment was conducted in the same manner as described in Example 1 above.

Comparative Example 1

Except for using a sodium-containing oxide represented by the formula $Na_{0.7}CoO_2$ (preparation composition), an experiment was conducted in the same manner as described in Example 1 above.

Comparative Example 2

Except for using a sodium-containing oxide represented by the formula $Na_{0.7}Co_{17/24}Mn_{7/24}O_2$ (preparation composition), an experiment was conducted in the same manner as described in Example 1 above.

Comparative Example 3

Except for using a sodium-containing oxide represented by the formula $Li_{0.1}Na_{0.7}Co_{17/24}Mn_{7/24}O_2$ (preparation composition), an experiment was conducted in the same manner as described in Example 1 above.

Table 1 summarizes the preparation compositions of the sodium-containing oxides of Examples 1 to 5 and Comparative Examples 1 to 3 and the results of composition analysis for the lithium-containing oxides of Examples 1 to 5 and Comparative Examples 1 to 3. The composition ratios of the lithium-containing oxides were determined by atomic emission spectroscopy for lithium and sodium, and ICP emission spectroscopy for cobalt and manganese. Note that the composition ratios are shown taking the sum of cobalt and manganese as 1, and oxygen as 2.

TABLE 1

|  | Sodium-containing oxide | Lithium-containing oxide |
|---|---|---|
| Ex. 1 | $Na_{0.7}Co_{11/12}Mn_{1/12}O_2$ | $Li_{0.94}Na_{0.02}Co_{0.92}Mn_{0.08}O_2$ |
| Ex. 2 | $Na_{0.7}Li_{0.1}Co_{11/12}Mn_{1/12}O_2$ | $Li_{0.95}Na_{0.02}Co_{0.92}Mn_{0.08}O_2$ |
| Ex. 3 | $Na_{0.7}Co_{10/12}Mn_{2/12}O_2$ | $Li_{0.86}Na_{0.01}Co_{0.83}Mn_{0.17}O_2$ |
| Ex. 4 | $Na_{0.7}Li_{0.1}Co_{10/12}Mn_{2/12}O_2$ | $Li_{0.89}Na_{0.01}Co_{0.83}Mn_{0.17}O_2$ |
| Ex. 5 | $Na_{0.7}Li_{0.1}Co_{9/12}Mn_{3/12}O_2$ | $Li_{0.80}Na_{0.004}Co_{0.75}Mn_{0.25}O_2$ |
| Comp. Ex. 1 | $Na_{0.7}CoO_2$ | $Li_{0.92}Na_{0.05}CoO_2$ |
| Comp. Ex. 2 | $Na_{0.7}Co_{17/24}Mn_{7/24}O_2$ | $Li_{0.78}Na_{0.011}Co_{0.71}Mn_{0.29}O_2$ |
| Comp. Ex. 3 | $Li_{0.1}Na_{0.7}Co_{17/24}Mn_{7/24}O_2$ | $Li_{0.79}Na_{0.008}Co_{0.71}Mn_{0.29}O_2$ |

Figure 2:
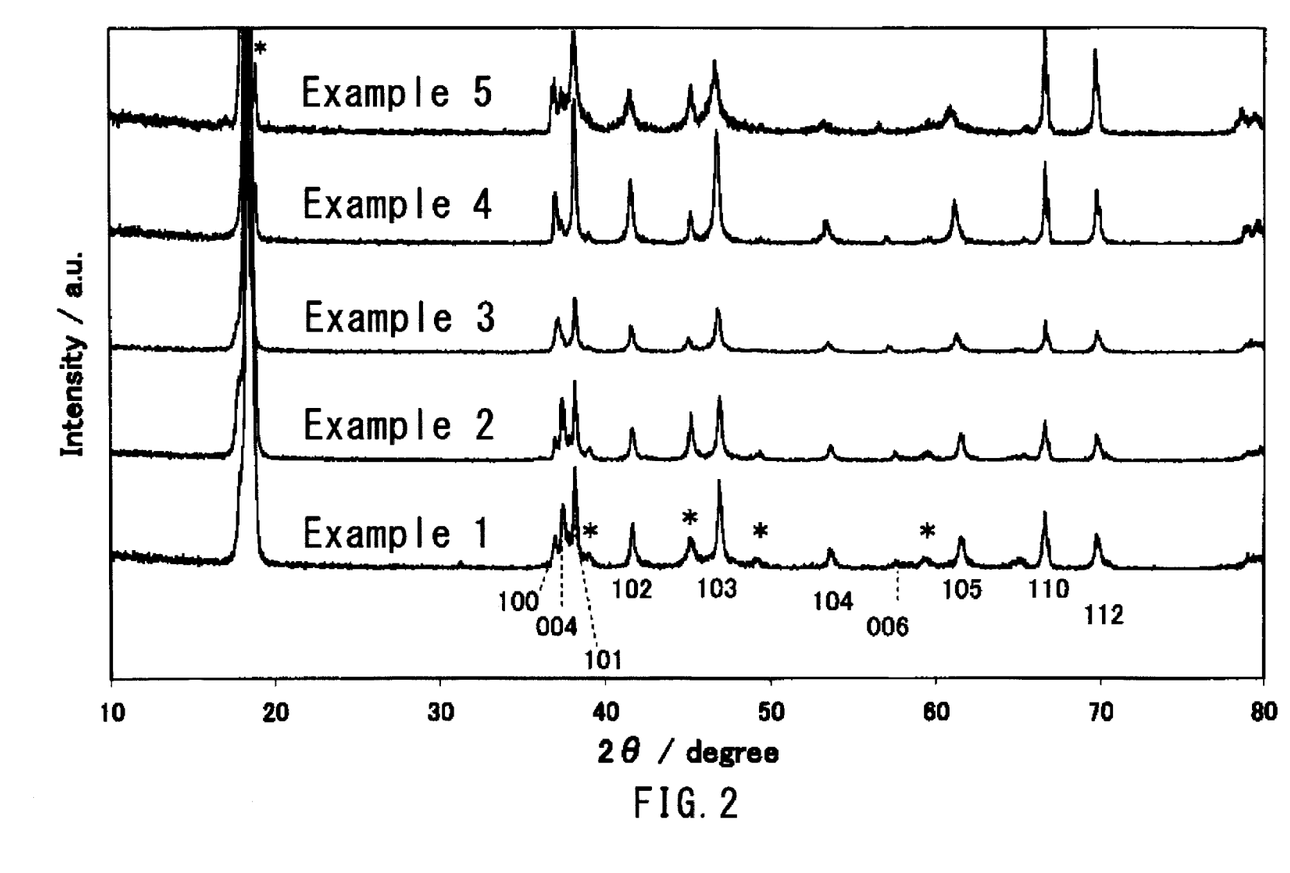
FIG. 2 is a graph illustrating the XRD patterns of the positive electrode active materials prepared for Examples 1 to 5.

The results of an XRD analysis for the lithium-containing oxides of Examples 1 to 5 are shown in FIG. 2. $CuK_\alpha$ radiation was used as the radiation source for the XRD analysis. The three-digit numbers near the bottom of the figure indicate the plane indices of the peaks attributable to an O2 structure. The asterisks indicate the peaks for impurity phases.

FIG. 2 indicates that the main structure of each of Examples 1 to 5 is an $O_2$ structure belonging to the space group P6₃mc. The impurity phases are considered to be attributable to $LiCoO_2$ having an O3 structure, for example. For the samples with high cobalt composition ratios, no peak corresponding to $Li_2MnO_3$ was observed, but peak profiles corresponding to $LiCoO_2$ having an O3 structure were observed. The results indicate that the lithium added to the sodium oxides was utilized mainly for the generation of O3-$LiCoO_2$, and the amount of $Li_2MnO_3$ generated was very small, as large as about 5%.

Figure 3:
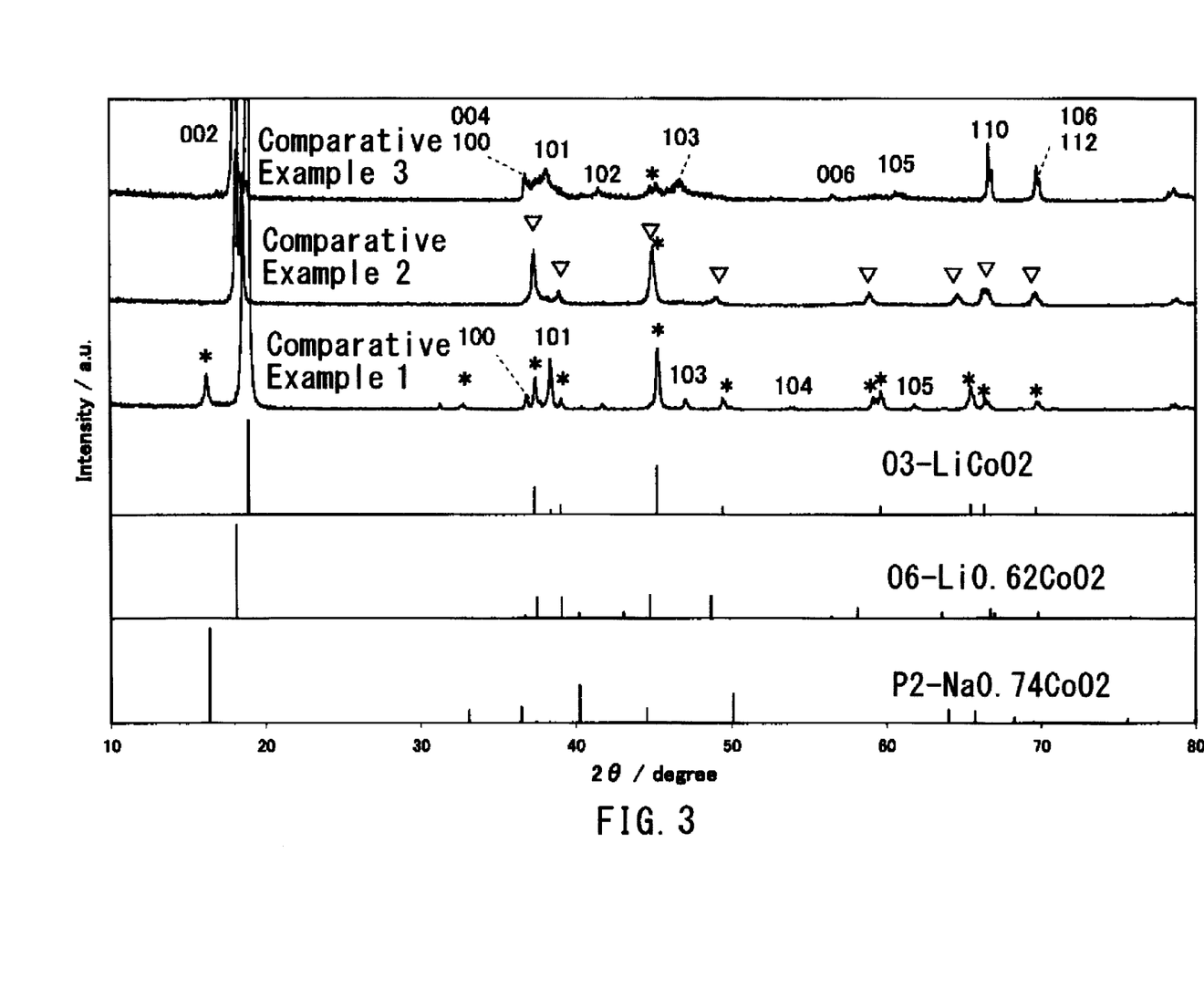
FIG. 3 is a graph illustrating the XRD patterns of the positive electrode active materials prepared for Comparative Examples 1 to 3.

FIG. 3 shows the results of XRD diffraction analysis for the lithium-containing oxides of Comparative Examples 1 to 3, and the patterns for $LiCoO_2$ (PDF #75-0532), $Li_{0.62}CoO_2$ (PDF #77-1868), and $Na_{0.74}CoO_2$ (PDF #87-0274) from the Powder Diffraction File.

$LiCoO_2$ having an O3 structure contained in Comparative Examples 1 to 3 and the sodium-containing oxide not having been ion exchanged observed in Comparative Example 1 are classified as impurity phases, and the peaks attributable to the impurity phases are indicated by asterisks.

The three-digit numbers in FIG. 3 indicate the indices of the peaks attributable to an O2 structure. The triangles pointing downward indicate the peaks attributable to an O6 structure (the space group R-3m). The O6 structure is a crystal structure in which a lithium atom exists at the center of the oxygen octahedron and six kinds of stacks comprising a layer including oxygen and a layer including a transition metal oxide $MO_6$ exist per unit cell.

FIG. 3 indicates that the main structure of Comparative Example 1 is an O3 structure and that the main structure of Comparative Example 2 is an O6 structure. In Comparative Example 3, the peaks corresponding to an O2 structure are observed, although the peak intensities are low. Table 2 below shows the discharge capacity density for the first cycle, the average discharge potential, and the energy density for each of Examples 1 to 5 and Comparative Examples 1 to 3 when charged and discharged under the foregoing conditions.

TABLE 2

|  | Discharge capacity density (mAh/g) | Average discharge potential V (vs. Li/Li⁺) | Energy density (mWhg) |
|---|---|---|---|
| Ex. 1 | 236 | 4.02 | 949 |
| Ex. 2 | 246 | 4.02 | 988 |
| Ex. 3 | 243 | 3.91 | 952 |
| Ex. 4 | 251 | 3.94 | 989 |
| Ex. 5 | 245 | 3.86 | 947 |
| Comp. Ex. 1 | 223 | 4.06 | 906 |
| Comp. Ex. 2 | 218 | 3.87 | 842 |
| Comp. Ex. 3 | 238 | 3.81 | 909 |

The results shown in Table 2 clearly demonstrate that the discharge capacity densities of Examples 1 to 5 were improved over Comparative Examples 1 and 2. The reason is believed to be that the crystal structure of each of the positive electrode active materials of Examples 1 to 5 is stable at a high potential because each of the positive electrode active materials has an O2 crystal structure containing cobalt and manganese and having a high cobalt content. The discharge capacity densities and the average discharge potentials for Examples 1 to 4 in the range of 3.2 V to 4.8 V (vs. Li/Li⁺) are as follows; 222 mAh/g and 4.09 V for Example 1, 228 mAh/g and 4.10 V for Example 2, 224 mAh/g and 4.14 V for Example 3, and 217 mAh/g and 4.16 V for Example 4, respectively. Thus, it is more preferable that the battery be charged and discharged in the foregoing potential range because a higher average discharge potential can be obtained.

The average discharge potentials of Examples 1 to 5 are higher than that of Comparative Example 3. The reason is believed to be that the positive electrode active materials of Examples 1 to 5 contain larger amounts of cobalt in the O2 structure containing cobalt and manganese than that of Comparative Example 3. Note that JP 2009-032681 A (Patent Document 1) discloses that the discharge capacity density can be increased by allowing a material having an O2 structure to contain $Li_2MnO_3$. However, from the disclosure of Patent Document 1, it is impossible to anticipate that the average discharge potential can be increased by increasing the amount of the cobalt in the $O_2$ structure containing cobalt and manganese. Moreover, increasing the amount of cobalt in the O2 structure containing cobalt and manganese means reducing the relative amount of $Li_2MnO_3$, which conflicts with the inventive idea of Patent Document 1. The energy densities of Examples 1 to 5 are higher than those of Comparative Examples 1 to 3. The energy density was estimated simply as the value obtained by multiplying the initial discharge capacity density and the average discharge potential. For the batteries aiming at higher energy density, the energy density value is more important than the values of the discharge capacity density and the average discharge potential alone.

Of Examples 2, 4, and 5, Examples 2 and 4 exhibited higher energy densities. The reason is believed to be that the positive electrode active materials of Examples 2 and 4 contain larger amounts of cobalt than the positive electrode active material of Example 5, and the average discharge potentials are accordingly higher.

Example 2 shows a higher discharge capacity density than Example 1, and likewise, Example 4 shows a higher discharge capacity density than Example 3. The reason is believed to be that, since lithium is added to the sodium-containing oxide that is the substance before the ion exchange, a trace amount of $Li_2MnO_3$ or the like is contained as a complementary structure in addition to the main structure in the positive electrode active material after the ion exchange. This complementary structure of $Li_2MnO_3$ is believed to contribute to the increase of the discharge capacity density by interacting with the main structure having an O2 structure.

FIG. 3 indicates that the micro structures of Comparative Examples 2 and 3 are different in spite of their similarity in the compositions of the lithium-containing oxides. This structural difference made the difference of discharge capacities shown in Table 2. This suggests characteristics of batteries can be different even if the compositions of the batteries are similar. The difference in the micro structures seemed to be due to the amount of lithium contained in the sodium-containing oxides.

Comparative Example 4

Lithium carbonate ($Li_2CO_3$) and cobalt (II, III) oxide ($Co_3O_4$) were mixed and kept at 900° C. for 10 hours, to obtain a lithium-containing oxide. This was used as the positive electrode active material, and a test cell was prepared in the same manner as described in the foregoing. The obtained test cell was repeatedly charged and discharged 10 times within the range of from 2.0-4.6 V (vs. $Li/Li^+$). The current density in this test was set at 2 $mA/cm^2$.

Here, although the charge-discharge operations were repeated with a current density of 2 $mA/cm^2$, the resulting capacity retention ratio would be the same as obtained after the charge-discharge operations were repeated with a current density of 0.1 $mA/cm^2$. The reason why the end-of-charge potential was not set at 5.0 V is that it is known that the crystal structure of the $LiCoO_2$ having an O3 structure becomes instable at a high potential. Generally, when the end-of-charge potential is low, the capacity retention ratio obtained after the charge-discharge operations are repeated is higher than when the end-of-charge potential is high.

Comparative Example 5

Sodium nitrate ($NaNO_3$), lithium carbonate ($Li_2CO_3$), and cobalt (II, III) oxide ($Co_3O_4$) were mixed and kept at 900° C. for 10 hours, to obtain a sodium-containing oxide. Then, 5 g of the sodium-containing oxide was immersed in 150 mL of a hexanol solution containing lithium bromide (LiBr) at a concentration 5 mol/L, and refluxed at 120° C. for 16 hours, to perform ion exchanging and to obtain a lithium-containing oxide. The resultant lithium-containing oxide was used as the positive electrode active material, and a test cell was prepared in the same manner as described in the foregoing. The obtained test cell was repeatedly charged and discharged 10 times within the range of from 2.0-4.6 V (vs. $Li/Li^+$). The current density in this test was set at 2 $mA/cm^2$.

Table 3 summarizes the results of composition analysis for the lithium-containing oxides of Comparative Examples 4 and 5. The composition ratios of the lithium-containing oxides were determined by atomic emission spectroscopy for lithium and sodium, and ICP emission spectroscopy for cobalt and manganese. Note that the composition ratios are shown taking the sum of cobalt and manganese as 1, and oxygen as 2.

TABLE 3

|  | Lithium-containing oxide |
| --- | --- |
| Comp. Ex. 4 | $Li_{0.99}CoO_2$ |
| Comp. Ex. 5 | $Li_{0.83}Na_{0.077}CoO_2$ |

Figure 4:
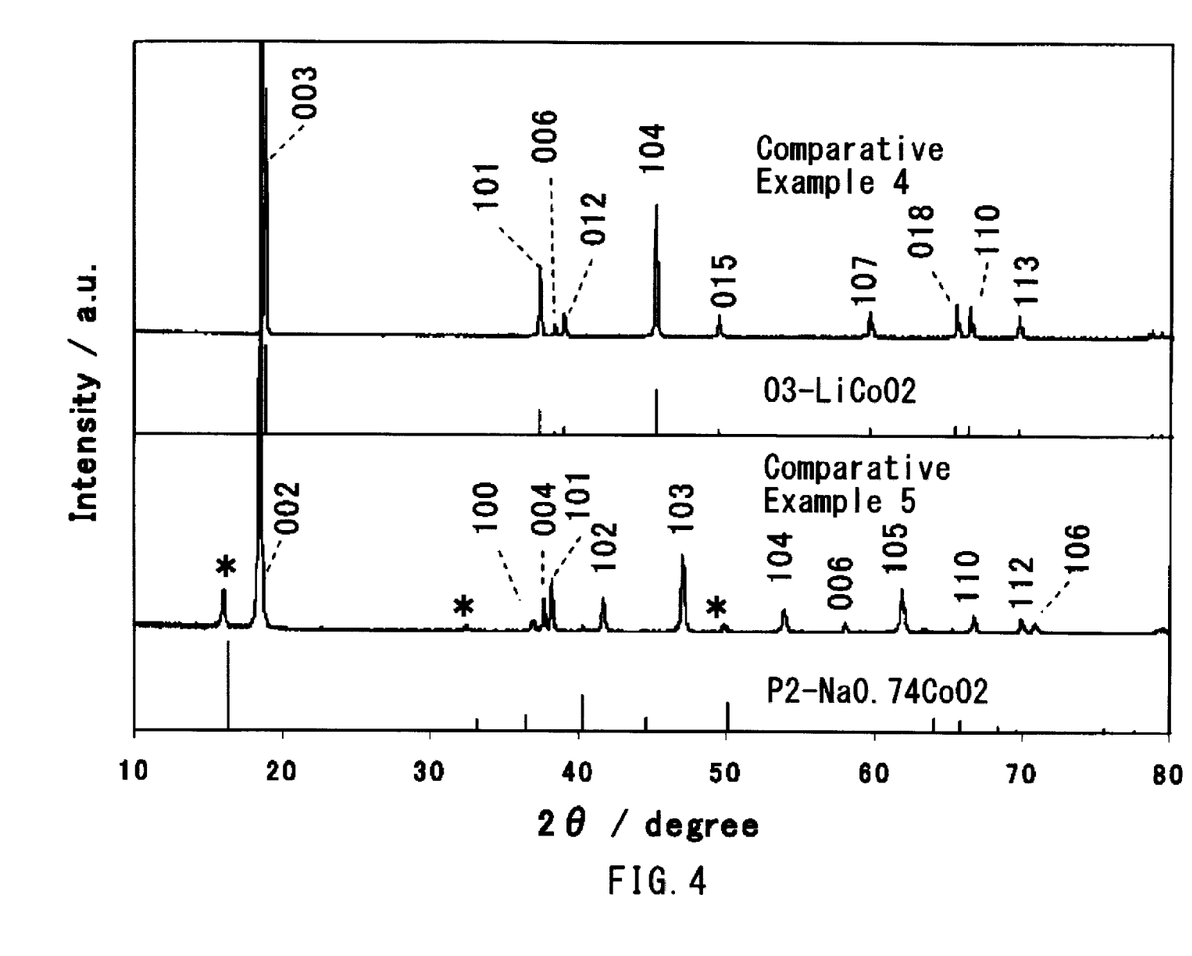
FIG. 4 is a graph illustrating the XRD patterns of the positive electrode active materials prepared for Comparative Examples 4 and 5.

The results of an XRD analysis for the lithium-containing oxides of Comparative Examples 4 and 5 are shown in FIG. 4. For each of the peaks, the corresponding plane index is indicated. From FIG. 4, it is understood that Comparative Example 4 belongs $LiCoO_2$ having an O3 structure. It is also understood that the main structure of Comparative Example belongs to an O2 structure, and that the sodium-containing oxide having a P2 structure, which is the precursor, remains without being ion exchanged. The peaks corresponding to the sodium-containing oxide having a P2 structure belonging to the space group $P6_3/mmc$ are indicated by asterisks.

Table 4 below shows the initial capacity densities and the capacity retention ratios after 10 cycles of Examples 1 to 5 as well as Comparative Examples 4 and 5.

TABLE 4

|  | Discharge capacity density (mAh/g) | Capacity retention ratio after 10 cycles (%) |
| --- | --- | --- |
| Ex. 1 | 236 | 82 |
| Ex. 2 | 246 | 86 |
| Ex. 3 | 243 | 86 |
| Ex. 4 | 251 | 89 |
| Ex. 5 | 245 | 87 |
| Comp. Ex. 4 | 225 | 72 |
| Comp. Ex. 5 | 213 | 76 |

The capacity retention ratio after 10 cycles of Comparative Example 5 is lower than those of Examples 1 to 5. The reason is believed to be as follows. The $O_2$ structure contained in the positive electrode active material of Comparative Example 5 does not contain manganese. Therefore, an irreversible change occurred in the crystal structure during the process in which lithium is deinserted from the crystal in the vicinity of 4.6 V (vs. $Li/Li^+$). As a consequence, it was no longer possible to maintain the initial crystal structure.

It should be noted that in Examples 1 to 5, the $LiCoO_2$ having an O3 structure is contained as an impurity. Therefore, it is expected that when the impurities are removed, the deterioration associated with the charge-discharge cycles can be further inhibited.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A non-aqueous electrolyte secondary battery, comprising:
   a positive electrode containing a positive electrode active material;
   a negative electrode; and
   a non-aqueous electrolyte,
   wherein the positive electrode active material consists of a lithium-containing oxide represented by the formula $Li_{x1}Na_{y1}Co_\alpha Mn_\beta O_\gamma$, where
   $0.66 < x1 < 1.1$,
   $0 < y1 \leq 0.02$,
   $0.80 \leq \alpha \leq 0.95$,
   $0 < \beta \leq 0.25$, and
   $1.9 \leq \gamma \leq 2.1$,
   wherein the lithium-containing oxide contains an oxide having an O2 structure, and
   wherein the negative electrode contains a negative electrode active material selected from the group consisting of silicon, carbon, tin, germanium, aluminum, lead, indium, gallium, lithium alloys, carbon or silicon materials in which lithium has been absorbed, and alloys and mixtures thereof.

2. The non-aqueous electrolyte secondary battery according to claim 1,
wherein the lithium-containing oxide is obtained by ion exchanging a portion of sodium contained, in a sodium-containing oxide with lithium, the sodium containing oxide being represented by the formula $Li_{x2}Na_{y2}Co_{\alpha}Mn_{\beta}O_{\gamma}$, where
$0<x2\leq0.1$,
$0.66<y2<0.75$,
$0.80\leq\alpha\leq0.95$,
$0<\beta\leq0.25$, and
$1.9\leq\gamma\leq2.1$.

3. The non-aqueous electrolyte secondary battery of claim 1, wherein $\alpha$ is $0.83\leq\alpha\leq0.92$.

4. The non-aqueous electrolyte secondary battery of claim 1, wherein the negative electrode active material is selected horn the group consisting of silicon, carbon, tin, germanium, aluminum, lead, indium, gallium and alloys and mixtures thereof.

5. A non-aqueous electrolyte secondary battery comprising:
a positive electrode containing a positive electrode active material;
a negative electrode; and
a non-aqueous electrolyte,
wherein the positive electrode active material consists of a lithium-containing oxide represented by the formula $Li_{x1}Na_{y1}Co_{\alpha}Mn_{\beta}O_{\gamma}$, where
$0.66<x1<1.1$,
$0<y1\leq0.02$,
$0.75\leq\alpha<1$,
$0<\beta\leq0.25$, and
$1.9\leq\gamma\leq2.1$,
wherein the lithium-containing oxide contains an oxide having an O2 structure,
wherein the average discharge potential of the positive electrode when charged and discharged within the range of 2.0-5.0 V (vs. Li/Li$^+$) with the current density at 0.1 mA/cm$^2$ is 3.86 V or higher, and
wherein the negative electrode contains a negative electrode active material selected from the group consisting of silicon, carbon, tin, germanium, aluminum, lead, indium, gallium, lithium alloys, carbon or silicon materials in which lithium been absorbed, and alloys and mixtures thereof.

6. The non-aqueous electrolyte secondary battery of claim 5, wherein $\alpha$ is $0.80\leq\alpha\leq0.95$.

7. The non-aqueous electrolyte secondary battery of claim 5, wherein $\alpha$ is $0.83\leq\alpha\leq0.92$.

8. The non-aqueous electrolyte secondary battery of claim 5, wherein the average discharge potential of the positive electrode when charged and discharged within the range of 2.0-5.0 V (vs. Li/Li$^+$) with the current density at 0.1 mA/cm$^2$ is 3.91 V or higher.

9. The non-aqueous electrolyte secondary battery of claim 8, wherein $\alpha$ is $0.80\leq\alpha<0.95$.

10. The non-aqueous electrolyte secondary battery of claim 8, wherein $\alpha$ is $0.83\leq\alpha\leq0.92$.

11. The non-aqueous electrolyte secondary battery of claim 5, wherein the negative electrode active material is selected from the group consisting of silicon, carbon, tin, germanium, aluminum, lead, indium, gallium and alloys and mixtures thereof.

12. A non-aqueous electrolyte secondary battery, comprising:
a positive electrode containing a positive electrode active material;
a negative electrode; and
a non-aqueous electrolyte,
wherein the positive electrode active material consists essentially of a lithium-containing oxide represented by the formula $Li_{x1}Na_{y1}Co_{\alpha}Mn_{\beta}O_{\gamma}$, where
$0.66<x1<1.1$,
$0<y1\leq0.02$,
$0.80\leq\alpha\leq0.95$,
$0<\beta\leq0.25$, and
$1.9\leq\gamma\leq2.1$
wherein the lithium-containing, oxide contains an oxide having an O2 structure, and
wherein the negative electrode contains as negative electrode active material selected from the group consisting of silicon, carbon, tin, germanium, aluminum, lead, indium, gallium, lithium alloys, carbon or silicon materials in which lithium has been absorbed, and alloys and mixtures thereof.

13. The non-aqueous electrolyte secondary battery of claim 12, wherein the negative electrode active material is selected from the group consisting of silicon, carbon, tin, germanium, aluminum, lead, indium, gallium and alloys and mixtures thereof.

\* \* \* \* \*